United States Patent [19]
Schroth

[11] 3,984,942
[45] Oct. 12, 1976

[54] INFLATABLE CLOSURE SEAL FOR SLIDING DOORS
[75] Inventor: Raymond A. Schroth, Pawling, N.Y.
[73] Assignee: The Presray Corporation, Pawling, N.Y.
[22] Filed: Sept. 17, 1975
[21] Appl. No.: 614,248

[52] U.S. Cl. .................................. 49/477; 49/495; 220/232
[51] Int. Cl.² ......................................... E06B 7/22
[58] Field of Search ..................... 49/477, 495, 498; 220/232; 277/34, 27; 52/2

[56] References Cited
UNITED STATES PATENTS

| | | | |
|---|---|---|---|
| 3,042,980 | 7/1962 | Brinsmade | 49/477 |
| 3,106,422 | 10/1963 | White | 49/495 X |
| 3,110,065 | 11/1963 | Dennis | 49/477 |
| 3,178,779 | 4/1965 | Clark et al. | 49/477 |
| 3,397,490 | 8/1968 | Carlson | 49/477 X |

Primary Examiner—Ramon S. Britts
Attorney, Agent, or Firm—Mandeville and Schweitzer

[57] ABSTRACT

The disclosure relates to improvements in pneumatically inflatable seals for sliding doors. The seal is in the form of an elongated elastomeric tube disposed in a channel adjacent to the door frame. After closing of the door or doors, the seal is expanded by pneumatic pressure, tightly closing the space between the door and the channel. The invention is directed specifically to improvements in the construction and configuration of the sealing element, for improving sealing effectiveness in the region at the extremity or extremities of the sealing element. The improvement is realized by incorporating one or more longitudinally disposed, deformable sealing ribs, providing sealing contact between the inflatable seal and the door surface in a transition zone at the end of the tubular sealing element, where the element does not fully expand when subjected to internal fluid pressure.

6 Claims, 7 Drawing Figures

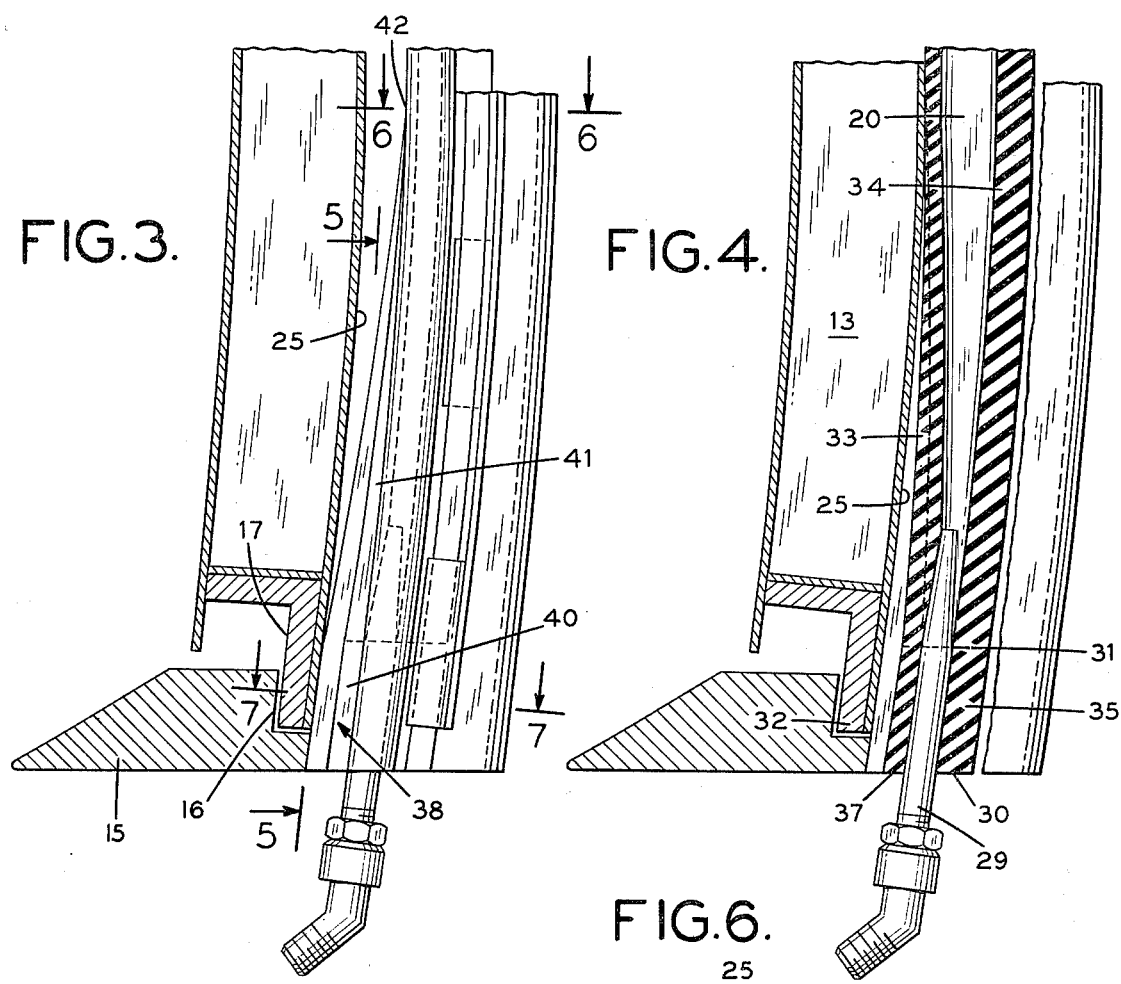
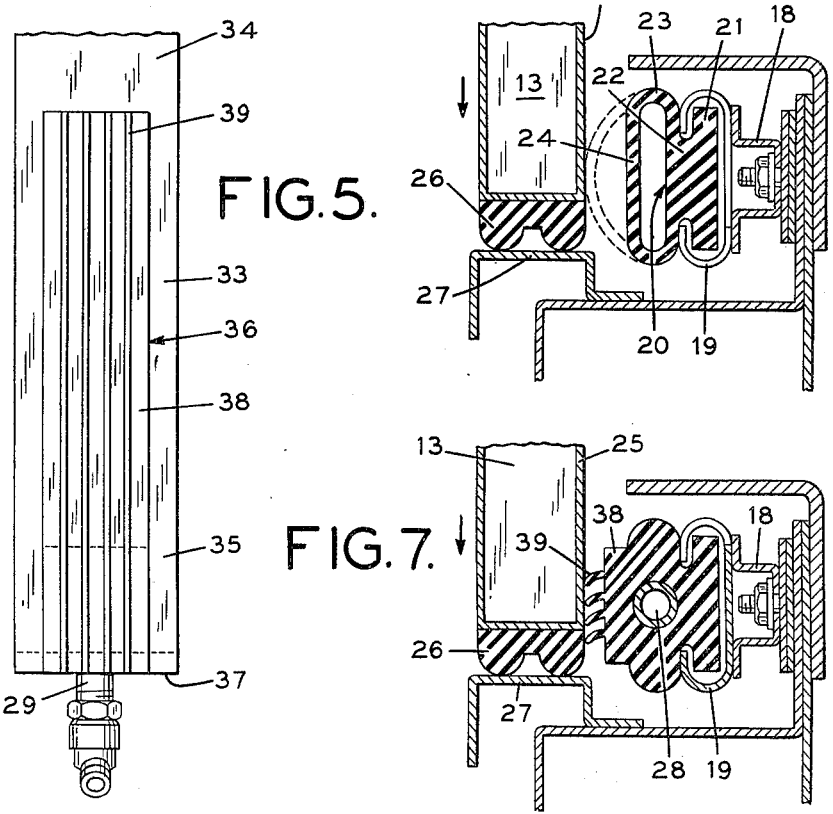

INFLATABLE CLOSURE SEAL FOR SLIDING DOORS

RELATED PATENTS

The present application is related to the subject of the Carlson U.S. Pat. No. 3,397,490, and represents an adaptation and improvement thereon for the end use presently contemplated.

BACKGROUND AND SUMMARY OF THE INVENTION

In the above mentioned Carlson U.S. Pat. No. 3,397,490, there is described an improved arrangement for providing a pneumatically inflatable seal for door, hatches and similar closures. A seal of the general type shown and described has found advantageous use in connection with sliding door seals for modern railroad passenger cars. Railroad passenger cars, such as typically used on commuter railroads for example, frequently are designed with modern, aerodynamic shaping and are provided with relatively large access doors for rapid boarding and discharge of passengers. Sliding doors are particularly useful for such an application. Because these cars are designed for travel at relatively high speeds, effective sealing of the closed door is important, and pneumatically inflatable seals of the general type shown in the beforementioned Carlson patent have been used to advantage for this purpose.

In the construction of known inflatable seals, it is conventional to extrude a tubular body of elastomeric material, which is cut to appropriate length. This tubular body is closed at both ends by means of a solid plug of compatible material, which also mounts the necessary hardware for inflating and deflating the seal when desired.

Because of the physical limitations of the door construction in a typical passenger railroad vehicle of the type contemplated, the necessary presence in the inflatable tube of solid plug end sections requires short transition areas at the end extremities of the sealing elements that do not fully expand when the seal is inflated. Typically this transition area is located at the lower corners of a door frame, and this condition can result in a seal which is only partially effective in that transition area.

It is an objective of the invention to provide an improved, inflatable door seal, for the type of utilization contemplated above, in which the inflatable seal is provided in the area of the necessary solid plug enclosure, with special transition sealing means which, notwithstanding limited inflation of the plug end area, provides for fully effective sealing of a sliding door closure.

For a better understanding of the above and other features and advantages of the invention, reference should be made to the following detailed description of a preferred embodiment and to the accompanying drawings.

DESCRIPTION OF THE DRAWINGS

FIG. 3 is an enlarged, fragmentary cross sectional view of the area shown in broken lines in FIG. 2.

FIG. 4 is a cross section view similar to FIG. 3, illustrating the inflatable sealing element in cross section and in inflated condition.

FIGS. 5–7 are cross sectional views taken generally along lines 5—5, 6—6 and 7—7 respectively of FIG. 3.

DESCRIPTION OF A PREFERRED EMBODIMENT OF THE INVENTION

Figure 1:
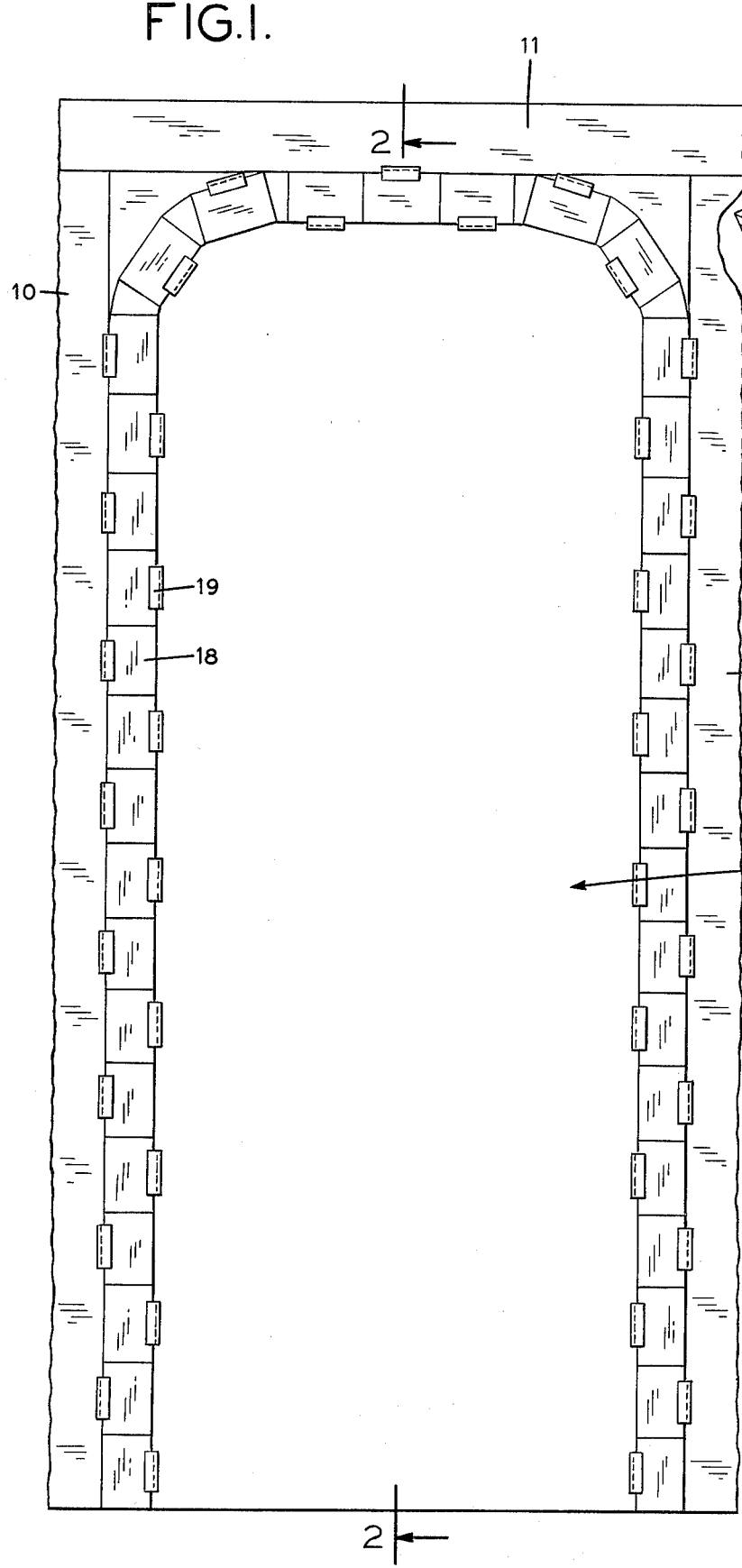
FIG. 1 is a elevational view of a door opening suitable for utilization of the door sealing arrangement of the invention.
Figure 2:
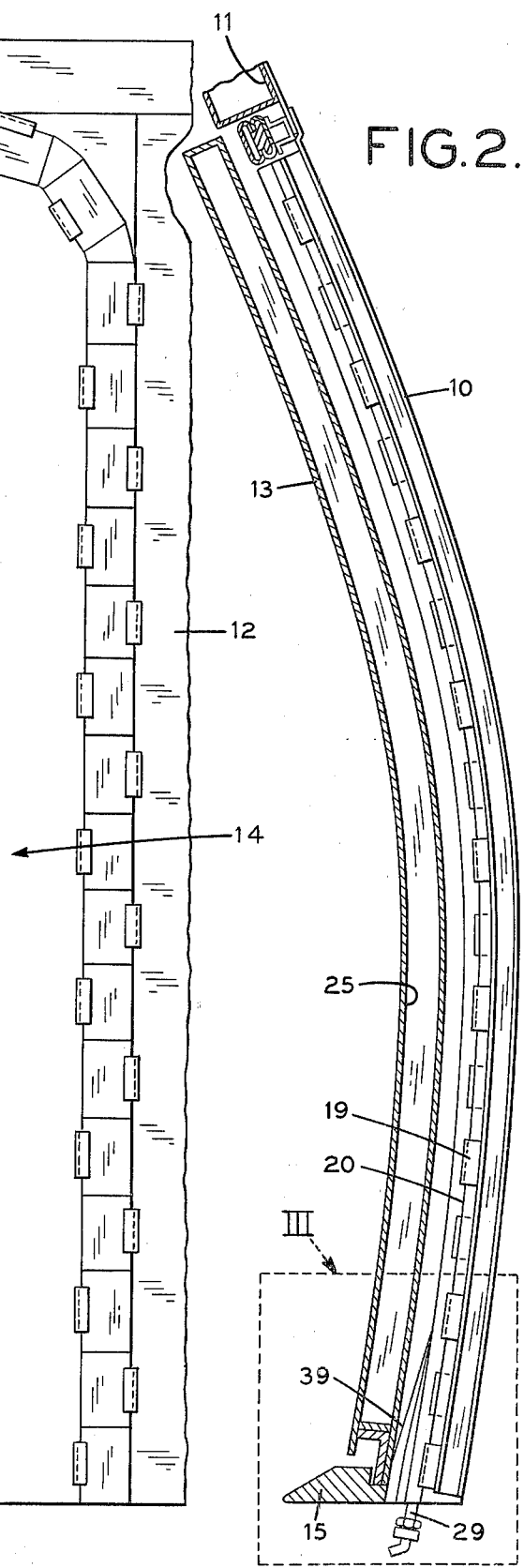
FIG. 2 is a cross sectional view as if taken along line 2—2 of FIG. 1, but including an installed, inflatable sealing element and a sliding door.

Referring now to the drawings, the reference numerals 10–12 represent portions of a frame structure forming part of a typical sliding door assembly. For convenience of description, it is to be assumed that the door assembly illustrated is of the type used on railroad passenger cars of modern construction. However, it is of course to be understood that the principles of the invention are not in any way limited to such applications. In the illustrated arrangement, the frame structure 10–12 is disposed generally on the exterior side of a sliding door, designated by the numeral 13. The means for guiding, supporting and actuating the door 13 are not germane to the invention and are not illustrated in full detail. Typically, however, the structure may include a threshold plate 15, which is recessed at 16 to receive a downwardly extending guide flange 17 forming or secured to the bottom edge of the door.

As shown particularly in FIG. 1, there is mounted around the periphery of the door opening an inwardly facing backing frame 18 to which are secured a series of flange receiving clips 19. As described in more detail in the aforementioned Carlson U.S. Pat. No. 3,397,490, the flange receiving clips 19 are arranged alternately in oppositely facing directions. The arrangement is such that an elongated, continuously flanged tubular sealing element 20, of a cross section as generally reflected in FIG. 6, may be easily inserted in the clips 19 by progressively bending the sealing element back and forth and inserting the flange 21 under the clips, one at a time. Once installed, the seal is self-retaining, because of its tendency to remain in the general configuration of the frame 18. In this respect, the sealing element initially is cured in the general configuration of the frame and will retain that configuration unless forceably displaced from it.

A typical cross sectional configuration of the sealing element 20 is as shown in FIG. 6, there being a solid flange portion 21, a short neck area 22, and a hollow tubular inflatable section 23 joined to the flange 21 by the neck portion 22. The arrangement of the frame 18 and clips 19 is such that, in the uninflated or unexpanded condition of the sealing element 20, the inwardly facing sealing surface 24 of the tubular section 23 is spaced well outwardly (e.g., a half inch) from the outer or front surface 25 of the door. Thus, when the sealing unit 20 is uninflated, the sliding door 13 may be actuated laterally in opening and closing movements free of restraint from the sealing element. However, when the door is seated in the closed position, as reflected in FIGS. 6 and 7, with its leading edge 26 in contact with a vertical member 27 of the door frame, the sealing element 20 may be expanded by admitting air or other pressure fluid to the interior of the tubular section. This expands the sealing surface 24 inward into contact with the door surface around the entire inverted U-shaped area reflected by the shape of the frame 18 illustrated in FIG. 1. As a result, there is a tight sealing of the door around both of its vertical side edges and across the top. Along the bottom, the door is effectively sealed by the close fitting relationship of the flange 17 and threshold groove, 16.

In the practical construction of the sealing element 20, the tubular portion 23 thereof is continuously extruded. The base flange 21 and the neck portion 22 are comprised initially of completely separate and independent strip sections of uncured elastomeric material. Initial assembly procedures involve laying the flange and neck strips together with the extruded tubular section 23. The uncured strips are temporarily bonded in the configuration illustrated in FIG. 6, as an elongated length of material appropriate to extend around the entire frame 18. At each end of the elongated section, a generally solid plug (not specifically identified) of similar elastomeric material is inserted into the open end of the tubular section 23. This solid plug closes off the end of the tube, except for a central opening 28, in which is inserted a tubular air connection fitting 29. This entire assembly is then arranged in the desired configuration of the mounting frame 18 and cured under appropriate heat. In the course of the curing operation, the several initially independent sections of elastomeric material become fully bonded together, to form the unitary assembly reflected in FIG. 6, with the plug and fitted end sections, as reflected in FIGS. 4 and 7.

Because of the physical limitations of the door opening 14, the plugged end areas of the sealing strip 20, in the installed system, extend upward from the lower extremity 30 to an area as approximately designated by the numeral 31, above the lower extremity 32 of the door flange 17. When the sealing element is inflated and expanded, by the admission of air into the fitting 29 (occasionally at both ends), the sealing element expands, as indicated in broken lines in FIG. 6, throughout most of its length. However, in the end area occupied by the solid rubber plug and extending approximately up to the region 31, the sealing element is solid and unexpandable. Beyond that, in a transitional region 33 extending from the area 31 approximately to the area designated by the numeral 34, the sealing element partially expands, being restrained by the solid end area.

In the preferred construction of a pneumatically sealed sliding door system, it is desirable to provide for ample clearance between the uninflated seal and the front surface 25 of the sliding door, so that the door can be opened and closed without substantial frictional restraint from the seal. As a result, because of the essentially non-expandable nature of the plugged end area 35, below the line 31, the seal does not move outward to close off the clearance space in that area. Likewise, in the transition area 33, the seal only progressively closes off the clearance space, until full contact is made between the expanded sealing element 20 and the door 13 in the region above the area 34. Pursuant to the present invention, arrangements are provided for effectively closing off the clearance area without at the same time increasing significantly or unnecessarily the frictional restraint on the sliding door. To this end, an auxiliary seal element 36 (see FIG. 5) is bonded to the front face 24 of the sealing element, in the region extending from the lower edge extremity 37 up to the upper edge of the transition zone 33. The auxiliary sealing element 36 comprises a solid base portion 38 from which extend a plurality of vertically elongated, thin flexible sealing ribs 39.

To advantage, the solid base portion 38 of the sealing element may be of uniform thickness in the lower region 40, adjacent the solid plug portion 35 of the seal, then tapering gradually in the upper portion 41 opposite the transition region 33 of the seal. Likewise, the vertically extending ribs 39, which may be approximately equal in thickness to the solid base 38, may be of relatively uniform depth in the lower region 40, tapering gradually from that point up to the upper extremity 42. Typically, but not necessarily, the depth of the ribs 39 at any point may correspond approximately to or be proportional to the thickness of the underlying base portion. Thus, the overall sealing element, including the projecting ribs 39, may have a relatively uniform thickness in the lower region, and a gradually tapering thickness in the transitional region, tapering to a rather fine point at the upper extremity.

To greatest advantage, the overall thickness of the auxiliary sealing element 36 is such that, in the lower extremities 35 of the sealing element, the ribs 39 have a slightly interfering relationship with the front surface 25 of the sliding door 13. This is reflected particularly in FIG. 7. Thus, when the door 13 slides to its closed position, and prior to inflation of the pneumatic sealing element, the front surface 25 of the door will brush lightly against and have wiping contact with the lower portions of the flexible sealing ribs. The arrangement is also reflected in FIG. 3 of the drawings. In the uninflated condition of the seal, the tapered upper portions of the ribs 39 remain free of contact with the door surface 25. Accordingly, during opening and closing movements of the door, the only frictional restraint imposed on the door by the modified sealing element is that resulting from the light wiping action of the lower portions only of the sealing ribs 39. This is relatively insignificant and does not affect the proper functioning of the sliding door. Thereafter, when the sealing element is expanded, to the condition shown in FIG. 4, the transition area 33 of the sealing element moves toward the door surface 25 sufficiently to bring the sealing ribs 39 into at least light contact with the door surface, sufficient to effectively close off the clearance space and effectively seal off the lower portions of the closure.

One of the significant practical advantages to the auxiliary sealing element 36 is that it may be formed inexpensively in a simple mold and easily and inexpensively applied to the extremities of the sealing element 20 in the normal production lay up operations. The auxiliary sealing area thereafter becomes an integrally bonded portion of the overall sealing unit during the curing operation.

With the improvements reflected herein, the advantageous characteristics of the pneumatically inflatable seal are enhanced and more fully realized for the particular end use of sliding door seals for railroad passenger cars and the like. For such installations, the physical requirements of the door assembly give rise to difficulties in achieving ideal sealing effectiveness in the lower corner areas of the door. At the same time, however, the high speed travel of such cars makes it important to achieve fully effective sealing throughout. With the modified and improved sealing element disclosed herein, this is made possible at a minimum of expense in relation to conventional sealing elements, and without impairing the performance of the sliding door closure itself.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

1. In a fluid inflatable seal for a sliding door, the seal comprising an elongated tubular body extending along the frame structure of the door and expandable into sealing contact with a surface of the door, and where the tubular seal body is closed by solid closure means at its end extremities, the improvement which comprises
   a. an auxiliary sealing member bonded to the tubular sealing body for a short distance in the region of its end extremities,
   b. said auxiliary sealing member including longitudinally extending, flexible sealing ribs projecting outward from the sealing face of said tubular body,
   c. said ribs being of maximum effective depth in the immediate area of the end extremities of the tubular body and of progressively less effective depth away from said end extremities.

2. The inflatable seal of claim 1, further characterized by
   a. said sealing ribs being of a predetermined depth to have light, wiping contact with the lowermost regions only of the sliding door when the tubular body is in an uninflated condition.

3. The inflatable seal of claim 1, further characterized by
   a. said tubular body having a plug-like closure means, being substantially non-expandable by fluid pressure in a first zone occupied by said plug-like closure means, and being progressively expandable in a transition zone adjacent to said closure means,
   b. said sealing ribs being of progressively less effective depth over the length of the transition zone.

4. The inflatable seal of claim 3, further characterized by
   a. said sealing ribs being of said predetermined depth at the beginning of the transition zone and tapering to near zero depth at the end of the transition zone.

5. The inflatable seal of claim 1, further characterized by
   a. said auxiliary sealing element comprising a solid base portion bonded to said tubular body,
   b. said sealing ribs extending outward from said base portion,
   c. said base portion being of maximum thickness in the immediate area of the end extremities of the tubular body and of progressively less thickness away from said extremities.

6. The inflatable seal of claim 1, further characterized by
   a. said tubular body being so dimensioned and arranged as to provide a predetermined clearance space between its outer surface and said door when the tubular body is uninflated,
   b. the maximum effective depth of said ribs slightly exceeding the width of the clearance space,
   c. the depth of the ribs in the areas away from said end extremities being generally less than the width of said clearance space.

* * * * *